United States Patent [19]

Bateman

[11] 3,922,637
[45] Nov. 25, 1975

[54] AIRCRAFT LANDING APPROACH GROUND PROXIMITY WARNING SYSTEM

[75] Inventor: Charles Donald Bateman, Bellevue, Wash.

[73] Assignee: Sundstrand Data Control, Inc., Redmond, Wash.

[22] Filed: Oct. 3, 1974

[21] Appl. No.: 511,757

[52] U.S. Cl............................ 340/27 R; 244/77 A
[51] Int. Cl.².................... G08G 5/00; B64C 13/50
[58] Field of Search........ 340/27 R; 244/77 A, 77 V

[56] References Cited
UNITED STATES PATENTS 3,381,295    4/1968    Blackledge.............. 244/77 A;77 V

*Primary Examiner*—Thomas B. Habecker
*Attorney, Agent, or Firm*—Michael B. McMurry; Ted E. Killingsworth

[57] ABSTRACT

In order to provide for the additional effectiveness of a ground proximity warning system during a landing approach, the waypoint signal of an Area Navigation System is used in combination with an altitude above-ground-signal to compute a minimum terrain altitude for each point along the aircraft's approach to the runway. The minimum altitude is compared with the aircraft's actual altitude and if it is below the minimum an alarm is activated.

11 Claims, 2 Drawing Figures

3,922,637

AIRCRAFT LANDING APPROACH GROUND PROXIMITY WARNING SYSTEM

BACKGROUND OF THE INVENTION

The invention relates to the field of aircraft ground proximity warning systems and in particular to a system that provides proximity warnings during a landing approach.

In the prior art ground proximity ground warning systems, Astengo U.S. Pat. No. 3,715,718 and the application of Bateman Ser. No. 380,727 being representative examples, the proximity warning systems were not designed to cover every potentially dangerous situation which might be encountered during the final approach to a landing. For example, no warning is provided to the pilot when the aircraft is in full landing configuration and the aircraft is about to touch down short of the runway where there is no active Instrument Landing System (ILS) glide slope available.

SUMMARY OF THE INVENTION

It is accordingly an object of the invention to provide a ground proximity warning system that will be effective during the landing approach phase of aircraft operation where no ILS glide slope is available.

It is an additional object of the invention to provide a ground proximity warning system that utilizes the Area Navigation System in conjunction with altitude-above-ground signal to prevent an aircraft from landing short of the runway.

It is a further object of the invention to provide a system that will compute a minimum altitude above the terrain for safe operation during the landing of an aircraft.

The invention utilizes, as one input to the system, the distance-to-waypoint signal of an area navigation system so as to indicate the location of the end of the runway. This signal is then biased by a signal which represents a predetermined distance, for example, one-half mile, in order to prevent false warnings just before touch down. The biased distance-to-waypoint signal is then scaled by amplifier means into a signal that represents a minimum altitude over terrain for each point along the aircraft's approach to the runway.

The signal that represents the minimum altitude is then substracted from a signal that represents the actual aircraft altitude over the terrain and whenever this combined signal becomes negative a warning signal is transmitted to the pilot.

DETAILED DESCRIPTION OF THE INVENTION

Figure 1:
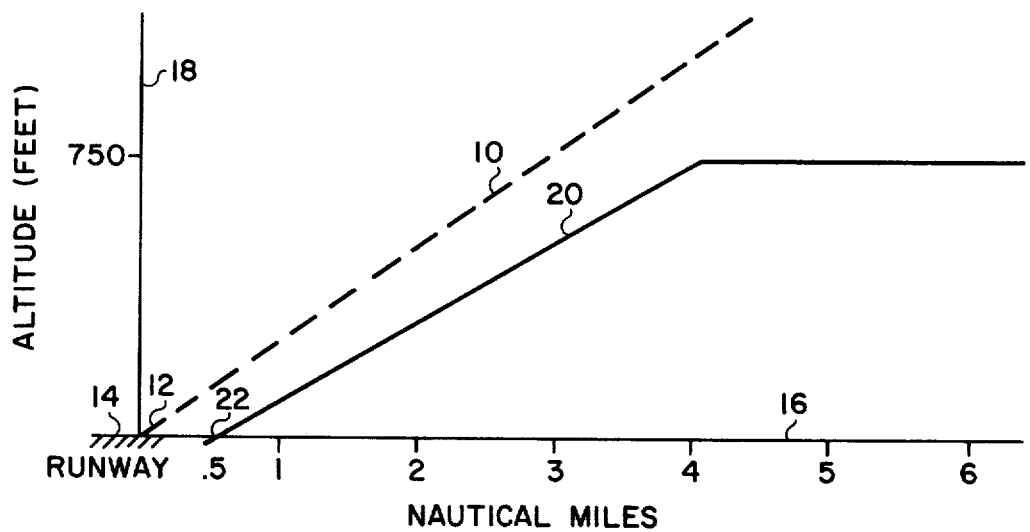
FIG. 1 illustrates in graphical form an approach path to a runway with the computed minimum altitude illustrated therein.

Referring to FIG. 1 of the drawings, there is illustrated a typical approach path 10 to the end 12 of the runway 14. The horizontal scale 16 of the graph represents the distance from the end of the runway in nautical miles and the vertical scale 18 represents the altitude in feet above the end 12 of the runway. In order to reduce the likelihood of an aircraft landing short of the runway, a minimum altitude for each point along the approach is set. This minimum altitude approach slope is represented by line 20 in FIG. 1. As the aircraft approaches the end 12 of the runway the minimum altitude decreases until, as in this illustration, it reaches a point 22 approximately one-half mile from the end of the runway. In the preferred embodiment of the invention, any time the aircraft descends below the minimum altitude the pilot will receive either an audio or visual warning. The exact character of the minimum altitude approach slope is determined by the desirability of maintaining a safe altitude above the ground at each point of the approach while at the same time keeping the number of false warnings at a minimum. One of the central objects of the invention is to allow the pilot normal variations in this glide path but at the same time to warn him any time the aircraft descends beyond a safe minimum altitude.

This is accomplished in the preferred embodiment of the invention by using the distance-to-waypoint signal of the Area Navigation System. The generation and nature of this signal is disclosed in the ARINC Characteristic 582-2, published Aug. 2, 1971, entitled Mark II Air Transport Area Navigation System, which is available through Aeronautical Radios, Inc., 2551 Riva Road, Annapolis, Maryland.

Figure 2:
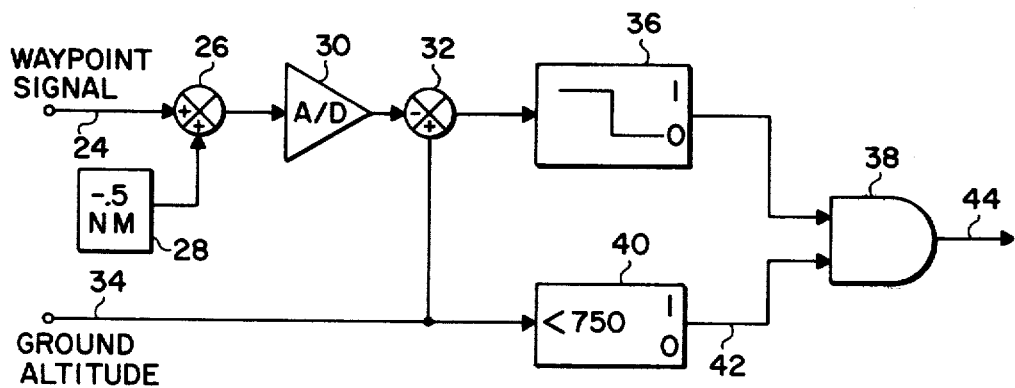
FIG. 2 is a functional block diagram of the circuitry to compute the minimum altitude.

In FIG. 2 there is shown in block diagram form the preferred embodiment of the circuitry to carry out the computation of the minimum altitude approach slope 20 of FIG. 1 and to generate a warning signal when the aircraft descends below that minimum during its approach to land.

In the circuit diagram of FIG. 2 the distance-to-waypoint signal is received over line 24. This signal represents the distance in nautical miles from the end 12 of the runway to the aircraft. This signal, on line 24, forms one input to the summing junction 26. The other signal input to the summing junction 26 is a constant signal generated by the signal source 28 which represents minus half a mile. At this point, it should be emphasized that the various numerical figures given for altitudes and distances are for illustrating the invention and are not meant to limit the scope of invention.

The output signal of the junction 26, used as input to the scaling amplifier 30, will therefore represent the distance of the aircraft from the end of the runway less 0.5 miles. The scaling amplifier 30 has its gain adjusted to a ratio that will give the slope of the minimum altitude line 20 of FIG. 1. For purposes of illustration this ratio in the preferred embodiment would be the altitude of 750 feet over 3.5 nautical miles. Using this ratio the slope of the line 20 of FIG. 1 would have a minimum altitude of zero feet when the aircraft is one-half mile from the end of the runway corresponding to point 22 in FIG. 1. By the same token, when the aircraft is 4 miles from the end of the runway the minimum altitude would be 750 feet.

The output of the scaling amplifier 30 is then used as a negative input to the summing junction 32. The second input to the circuit of FIG. 2 is a signal which represents the altitude of the aircraft from the ground on line 34. This signal is normally generated in an aircraft by means of a radio altimeter or "downlooking" radar which measures the transit time of a ratio signal generated in the aircraft and reflected from the ground. This signal is used as the other or positive input to the summing junction 32. As a result, the summing junction 32 will produce a signal of positive polarity if the altitude of the aircraft is above the minimum and it will produce a negative signal if the aircraft is below the minimum altitude. The detector 36 will generate, in response to the signal from the summing junction 32, a logical zero if the actual altitude above ground is greater than the minimum as represented by line 20 of FIG. 1 and, similarly, generate a logical 1 when the aircraft's altitude is below the computed minimum. The logic signals from the detector 36 are used as input to the AND gate 38. The other input to the AND gate 38 is received from a signal generator 40. The signal generator 40 responds to the ground altitude signal on line 34 and generates a logical 1 on line 42 when the aircraft's altitude is under 750 feet thereby enabling the gate 38 when the aircraft is below 750 feet.

Therefore, in normal operation, when the aircraft is making its approach and descends below 750 feet, the proximity warning system will be enabled through gate 38 and, if during the approach the aircraft should descend below the minimum computed altitude, a signal will be generated on line 44 which will be used to activate an alarm. The alarm itself may be similar to that disclosed in Astengo U.S. Pat. No. 3,715,718.

I claim:

1. A ground proximity warning system having signal input terminals effective to receive waypoint signals and ground-altitude signals for providing warning of descent below a minimum terrain-altitude comprising:
   conversion means responsive to the waypoint signal for converting said waypoint signal into a signal representing a predetermined minimum approach altitude;
   comparison means connected to said conversion means and to the terminal for receiving the ground altitude signal for comparing said minimum approach altitude signal to the ground altitude signal; and
   means responsive to said comparing means for generating a minimum altitude warning signal indicative of a predetermined relation between the aircraft's ground altitude and said minimum altitude signal.

2. The ground proximity warning system of claim 1 additionally including means for biasing the waypoint signal in order to prevent, during a predetermined portion of the approach, the minimum altitude warning signal from being generated.

3. The ground proximity warning system of claim 1 additionally including means for enabling said system below a predefined altitude.

4. The ground proximity warning system of claim 3 wherein said enabling means include:
   means responsive to the ground altitude signal for generating an enabling signal when the aircraft is below a predefined altitude; and
   gate means responsive to said enabling signal for enabling said warning signal.

5. The ground proximity warning system of claim 1 wherein said conversion means includes a scaling amplifier for generating a signal proportional to predefined ratio.

6. The ground proximity warning system of claim 5 wherein said ratio is a predetermined altitude over a predetermined distance from the end of the runway.

7. A ground proximity warning system having signal input terminals effective to receive waypoint signals and above the ground altitude signals for providing pilot warning of descent below a computed minimum altitude above the terrain during a landing approach comprising:
   first summing means for combining the way-point signal and a bias signal;
   scaling means responsive to said first summing means for scaling the output of said first summing means thereby providing a signal representive of the computed minimum altitude above the terrain;
   second summing means for substracting the output of said scaling means from the ground-altitude signal;
   circuit means for producing a first logic signal if the output of said second summing means is negative and a second logic signal if the output of said second summing means is positive; and
   enabling means for enabling a warning signal below a predetermined altitude.

8. The warning system of claim 7 wherein said bias signal represents a predetermined distance from the end of the runway.

9. The warning system of claim 7 wherein said scaling means is an amplifier responsive to the signal from said first summing means.

10. The warning system of claim 9 wherein said amplifier has a gain proportional to the ratio between a predetermined altitude and a predetermined distance from the runway.

11. The warning system of claim 10 wherein said enabling means comprises:
   logic means for generating an enabling signal when the aircraft is below a predetermined altitude; and
   a gate enabled by said enabling signal for transmitting one of said logic signals from said circuit means to a pilot alarm.

* * * * *